United States Patent
Iemura et al.

(10) Patent No.: US 11,022,484 B2
(45) Date of Patent: *Jun. 1, 2021

(54) OPTICAL RECEIVER MODULE HAVING A SHIFTED CENTER AXIS OF LIGHT RECEIVING ELEMENT

(71) Applicant: Lumentum Japan, Inc., Kanagawa (JP)

(72) Inventors: Koki Iemura, Kanagawa (JP); Michihide Sasada, Kanagawa (JP); Hiroyasu Sasaki, Kanagawa (JP)

(73) Assignee: Lumentum Japan, Inc., Kanagawa (JP)

(*) Notice: Subject to any disclaimer, the term of this patent is extended or adjusted under 35 U.S.C. 154(b) by 21 days.

This patent is subject to a terminal disclaimer.

(21) Appl. No.: 16/035,826

(22) Filed: Jul. 16, 2018

(65) Prior Publication Data

US 2018/0340820 A1   Nov. 29, 2018

Related U.S. Application Data

(63) Continuation of application No. 14/522,042, filed on Oct. 23, 2014, now Pat. No. 10,048,117.

(30) Foreign Application Priority Data

Nov. 15, 2013 (JP) ................. 2013-236514

(51) Int. Cl.
*G01J 1/02* (2006.01)
*G01J 1/04* (2006.01)
(Continued)

(52) U.S. Cl.
CPC ............. *G01J 1/029* (2013.01); *G01J 1/0204* (2013.01); *G01J 1/0214* (2013.01);
(Continued)

(58) Field of Classification Search
CPC ........ G01J 1/029; G01J 1/0214; G01J 1/0204; G01J 1/0411; G02B 6/2938;
(Continued)

(56) References Cited

U.S. PATENT DOCUMENTS

| 5,602,414 A | 2/1997 | Mitsui et al. |
| 5,610,390 A | 3/1997 | Miyano |

(Continued)

FOREIGN PATENT DOCUMENTS

| EP | 0 552 792 A1 | 7/1993 |
| JP | 62-9707 Y2 | 2/1987 |

(Continued)

OTHER PUBLICATIONS

U.S. Office Action received in corresponding U.S. Appl. No. 14/077,530 dated May 22, 2015.

(Continued)

*Primary Examiner* — Jennifer D Bennett
(74) *Attorney, Agent, or Firm* — Harrity & Harrity, LLP (57) ABSTRACT

An optical receiver module includes: a lens array including a plurality of condenser lenses arranged in one direction to define a plane with optical axes in parallel to each other; and a light receiving element array including a plurality of light receiving elements each configured to receive light emitted from each of the condenser lenses. The light receiving element array includes: a semiconductor substrate to which the light from each of the condenser lenses is input and through which the light is transmitted; and light receiving portions each configured to receive the light transmitted through the semiconductor substrate and convert the light into an electrical signal. A shift of the optical axis of each of the condenser lenses from a center of each corresponding (Continued)

one of the light receiving portions is larger in a direction perpendicular to the one direction within the plane than in the one direction.

6 Claims, 12 Drawing Sheets

(51) Int. Cl.
*G02B 6/293* (2006.01)
*G02B 6/42* (2006.01)
*G02B 3/00* (2006.01)

(52) U.S. Cl.
CPC .......... *G01J 1/0411* (2013.01); *G02B 6/2938* (2013.01); *G02B 6/4215* (2013.01); *G02B 3/005* (2013.01); *G02B 6/29365* (2013.01); *G02B 6/425* (2013.01)

(58) Field of Classification Search
CPC .. G02B 6/4215; G02B 6/29365; G02B 6/425; G02B 3/005; G02B 6/4204
See application file for complete search history.

(56) References Cited

U.S. PATENT DOCUMENTS

| | | | |
|---|---|---|---|
| 6,040,591 A | 3/2000 | Otsuka | |
| 6,945,711 B2 | 9/2005 | Chen et al. | |
| 7,351,945 B2 | 4/2008 | Campbell et al. | |
| 7,366,375 B2 | 4/2008 | Ohtorii | |
| 7,397,616 B2 | 7/2008 | Nagai et al. | |
| 7,847,852 B2* | 12/2010 | Kuriyama | H01L 27/14685 348/335 |
| 7,928,488 B2 | 4/2011 | Park | |
| 8,000,017 B2 | 8/2011 | Morioka | |
| 8,488,244 B1 | 7/2013 | Li et al. | |
| 10,048,117 B2* | 8/2018 | Iemura | G01J 1/029 |
| 2006/0113620 A1 | 6/2006 | Park | |
| 2006/0187798 A1 | 8/2006 | Ozawa et al. | |
| 2009/0008687 A1 | 1/2009 | Katsuno et al. | |
| 2009/0067055 A1* | 3/2009 | Yamamura | B29D 11/00278 359/622 |
| 2009/0226130 A1 | 9/2009 | Doany et al. | |
| 2010/0032005 A1* | 2/2010 | Ford | H01L 31/0543 136/246 |
| 2010/0209103 A1 | 8/2010 | Sakigawa et al. | |
| 2010/0247043 A1 | 9/2010 | Sugawara et al. | |
| 2011/0058771 A1 | 3/2011 | Lee et al. | |
| 2011/0299808 A1 | 12/2011 | Matsuoka et al. | |
| 2012/0177321 A1 | 7/2012 | Kuwahara et al. | |
| 2012/0263416 A1 | 10/2012 | Morioka | |
| 2013/0161497 A1 | 6/2013 | Sasada et al. | |

FOREIGN PATENT DOCUMENTS

| | | |
|---|---|---|
| JP | 4-342174 A | 11/1992 |
| JP | 05-224101 A | 9/1993 |
| JP | 7-14996 A | 1/1995 |
| JP | 10-268164 A | 10/1998 |
| JP | 10-270672 A | 10/1998 |
| JP | 2006-157004 A | 6/2006 |
| JP | 2006-235115 A | 9/2006 |
| JP | 2006-295222 A | 10/2006 |
| JP | 2009-16574 A | 1/2009 |
| JP | 2009-283516 A | 12/2009 |
| JP | 2010-225824 A | 10/2010 |
| JP | 2012-145614 A | 8/2012 |
| JP | 2012-181497 A | 9/2012 |
| JP | 2013-131637 A | 7/2013 |
| JP | 2013-200550 A | 10/2013 |
| WO | 2010/098171 A1 | 9/2010 |

OTHER PUBLICATIONS

Japanese Office Action received in corresponding Japanese Application No. 2013-193706 dated Feb. 21, 2017 and partial translation thereof.
Japanese Office Action received in corresponding Japanese Application No. 2013-236514 dated Jun. 27, 2017.

* cited by examiner

OFFSET BETWEEN CENTER AXIS OF
CONDENSER LENS AND CENTER OF
LIGHT RECEIVING PORTION($\mu$m)

FIG.6B

OFFSET BETWEEN CENTER AXIS OF
CONDENSER LENS AND CENTER OF
LIGHT RECEIVING PORTION($\mu$m)

OPTICAL RECEIVER MODULE HAVING A SHIFTED CENTER AXIS OF LIGHT RECEIVING ELEMENT

CROSS-REFERENCE TO RELATED APPLICATION

The present application claims priority from Japanese application JP2013-236514 filed on Nov. 15, 2013, the content of which is hereby incorporated by reference into this application.

BACKGROUND OF THE INVENTION

1. Field of the Invention

The present invention relates to an optical receiver module and an optical transmitter module.

2. Description of the Related Art

In general, an optical receiver module and an optical transmitter module used in optical communications or the like include, as well as a light receiving portion and a light emitting portion, various lenses for guiding light from an optical fiber to the light receiving portion or for guiding light from a transmitting portion to an optical fiber, respectively. In Japanese Patent Application Laid-open No. Hei 05-224101, among such optical receiver modules and optical transmitter modules, there is disclosed a configuration of a semiconductor light receiving device as an optical receiver module.

Further, the optical receiver module and the optical transmitter module exhibit a loss due to back reflection light, which is called an optical return loss (ORL), and regarding suppression of this loss, Japanese Patent Application Laid-open No. Hei 10-268164 discloses a configuration of arranging a light receiving portion surface obliquely with respect to a light beam from a condenser lens, and Japanese Utility Model Examined Publication No. Sho 62-006707 and Japanese Patent Application Laid-open No. 2013-200550 disclose configurations of arranging a light receiving portion with its axis shifted with respect to a condenser lens.

SUMMARY OF THE INVENTION

An optical receiver module or an optical transmitter module each including a plurality of channels respectively includes an optical demultiplexing circuit and an optical multiplexing circuit for demultiplexing light from a single optical fiber or multiplexing light in a plurality of wavelength regions to input the light to a single optical fiber. Each of the optical receiver module and the optical transmitter module includes a lens array including condenser lenses corresponding to the number of channels between the demultiplexing circuit and a light receiving portion or between the multiplexing circuit and a light emitting portion. Such a lens array is often formed in an integrated manner, or obtained by integrating lenses that are separately formed. In the condenser lenses of such a lens array, an axis misalignment and an angle misalignment are liable to occur, and hence it is difficult to arrange the lenses in a state of achieving high light usage efficiency. In addition, it is also required to suppress the above-mentioned light reflection attenuation amount in each of the channels.

When adjustments of such axis misalignment and angle misalignment are insufficient, a trouble is liable to occur in transmission of a signal because the light cannot be transmitted with desired intensity. In particular, in the optical receiver module, an optical crosstalk is liable to be generated, in which the light is received by a light receiving portion of a channel that is different from a demultiplexed channel.

The present invention has been achieved in view of the above-mentioned circumstances, and it is an object of the present invention to provide an optical receiver module and an optical transmitter module each including a plurality of channels with higher transmission efficiency.

According to one embodiment of the present invention, there is provided an optical receiver module, including: a lens array including a plurality of condenser lenses arranged in a first direction to define a single plane with optical axes in parallel to each other; and a light receiving element array including a plurality of light receiving elements each configured to receive light emitted from each corresponding one of the plurality of condenser lenses, in which: the light receiving element array includes: a semiconductor substrate to which the light from each of the plurality of condenser lenses is input and through which the light is transmitted; and light receiving portions each configured to receive the light transmitted through the semiconductor substrate and to convert the received light into an electrical signal; and a shift of the optical axis of each of the plurality of condenser lenses from a center of each corresponding one of the light receiving portions is larger in a second direction perpendicular to the first direction within the single plane than in the first direction.

Further, in the optical receiver module according to one embodiment of the present invention, a focal point of light focused by the each of the plurality of condenser lenses may be located closer to the each of the plurality of condenser lenses than the light receiving portions. In this case, the focal point of the light focused by a lens surface may be located inside the semiconductor substrate, and further in this case, the optical receiver module may further include lens surfaces formed on an input side of the semiconductor substrate and each configured to further focus the light from the condenser lens toward the light receiving portion. Further, the optical receiver module according to one embodiment of the present invention may further include an optical demultiplexing circuit configured to demultiplex input light into a plurality of light beams having different wavelengths from each other and to output the plurality of light beams to the respective plurality of condenser lenses.

Further, the optical receiver module according to one embodiment of the present invention may further include: a plate on which the lens array and the light receiving element array are to be arranged; and a support substrate arranged between the plate and the lens array, and the shift of the lens array in the second direction may be a shift in a direction apart from the plate.

Further, in the optical receiver module according to one embodiment of the present invention: the shift in the first direction may be in a range of from 0 μm to 10 μm; and the shift in the second direction may be in a range of from 8 μm to 25 μm.

According to one embodiment of the present invention, there is provided an optical transmitter module, including: a lens array including a plurality of condenser lenses arranged in a first direction to define a single plane with optical axes in parallel to each other; and a light emitting element array including a plurality of light emitting elements configured to emit light to be input to the plurality of condenser lenses, in which a shift of the optical axis of each of the plurality of condenser lenses from a center of each corresponding one of the plurality of light emitting elements is larger in a second direction perpendicular to the first direction within the single plane than in the first direction.

According to one embodiment of the present invention, it is possible to provide the optical receiver module and the optical transmitter module each including the plurality of channels with higher transmission efficiency.

DETAILED DESCRIPTION OF THE INVENTION

Figure 1:
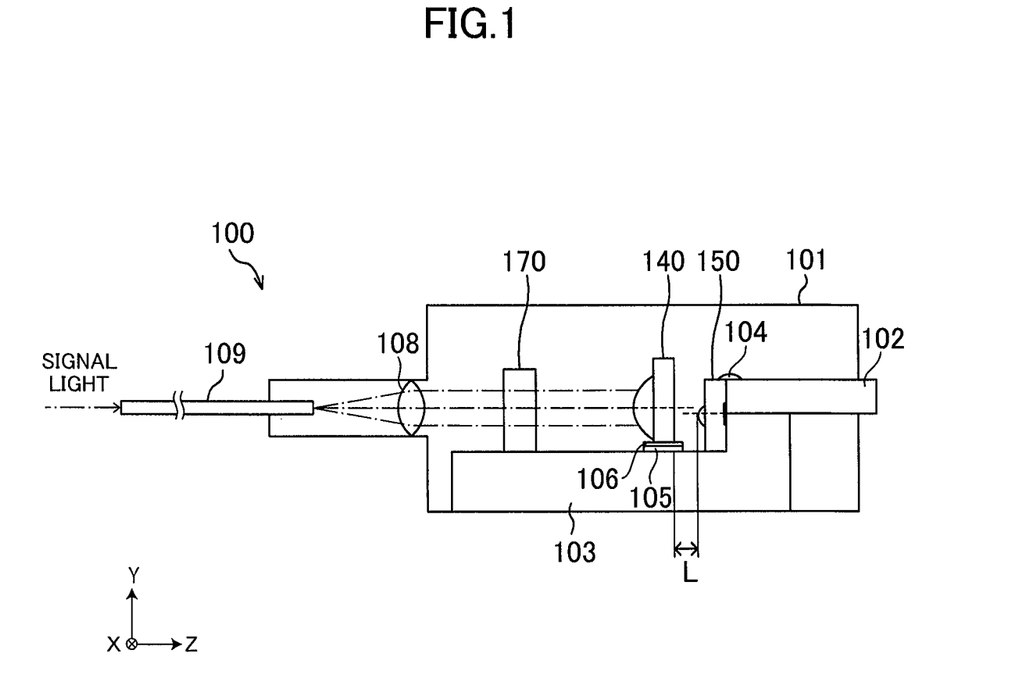
FIG. 1 is a diagram schematically illustrating a configuration example of an optical receiver module according to the present invention.

An optical receiver module according to one embodiment of the present invention is described below with reference to the accompanying drawings. FIG. 1 is a diagram schematically illustrating a configuration example of an optical receiver module according to the present invention. The optical receiver module 100 illustrated in FIG. 1 is, for example, an optical receiver module for use in optical communications or the like. The optical receiver module 100 includes a box-shaped casing 101, and a support substrate 103 is arranged in the casing 101. On the support substrate 103, an optical demultiplexing circuit 170 configured to demultiplex received light into four channels, a lens array 140 to which the demultiplexed light is input, a light receiving element array 150 configured to covert the received light into electrical signals, and a circuit board 102 configured to process the electrical signals received from the light receiving element array 150 via a bonding wires 104 are mounted. A collimator lens 108 is further arranged in the casing 101. Light input into the casing 101 from an optical fiber 109 is collimated by the collimator lens 108, and is received by the light receiving element array 150 via the optical demultiplexing circuit 170 and the lens array 140.

Figure 2:
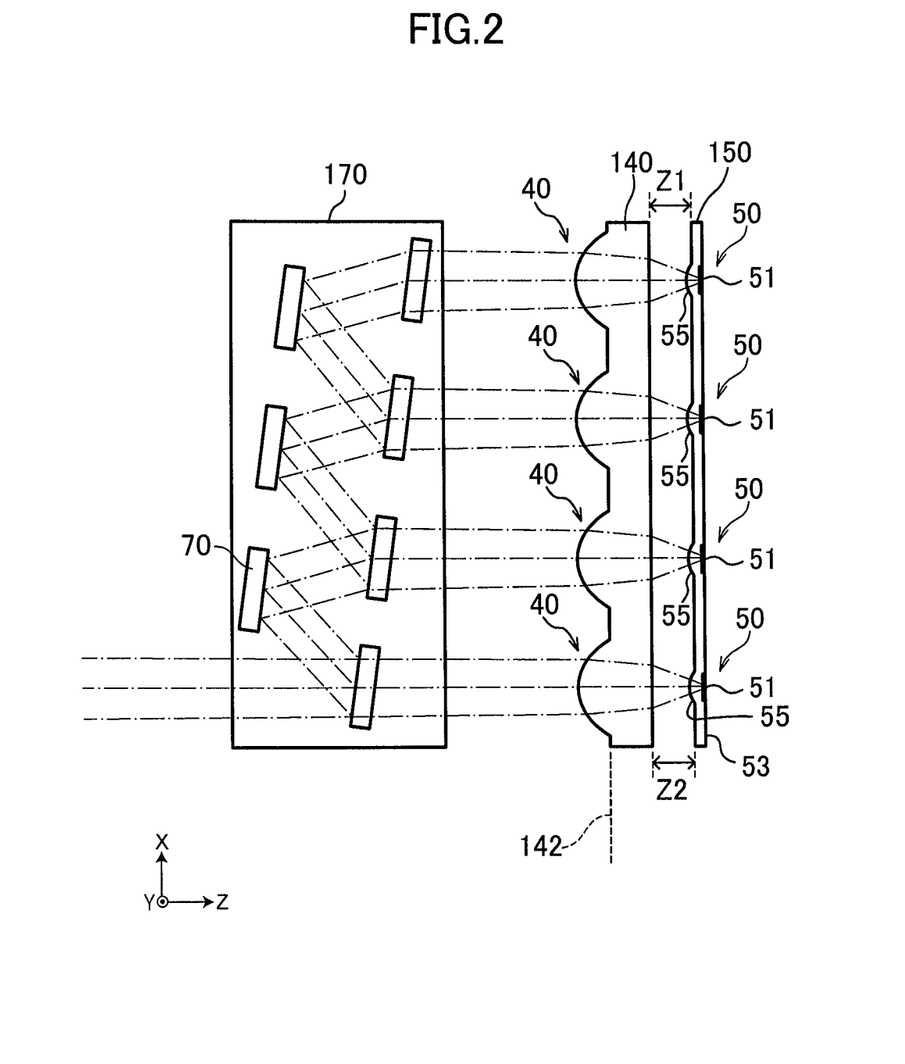
FIG. 2 is a plan view schematically illustrating parts of an optical demultiplexing circuit, a lens array, and a light receiving element array of the optical receiver module illustrated in FIG. 1.

FIG. 2 is a plan view schematically illustrating parts of the optical demultiplexing circuit 170, the lens array 140, and the light receiving element array 150 of the optical receiver module 100 illustrated in FIG. 1. The light collimated by the collimator lens 108 is input to the optical demultiplexing circuit 170. An input signal light is, for example, multiplexed light in which signals are multiplexed in four wavelength regions. The light input to the optical demultiplexing circuit 170 is demultiplexed into light of each of the four wavelength regions, and then respectively output to four-channel condenser lenses 40 of the lens array 140. The optical demultiplexing circuit 170 may be a spatial-optical-type optical demultiplexing circuit using half mirrors 70 as illustrated in FIG. 2. The optical demultiplexing circuit 170 may be other types of optical demultiplexing circuit such as a planar lightwave circuit (PLC)-type optical demultiplexing circuit.

The four condenser lenses 40 of the lens array 140 are arranged in one direction to define a single plane 142 with their optical axes in parallel to each other. Each of the four-channel condenser lenses 40 focuses the light from the optical demultiplexing circuit 170 toward each of four-channel light receiving elements 50 included in the light receiving element array 150. In this embodiment, as illustrated in FIGS. 1 and 2, the direction along which the condenser lenses 40 are arranged is defined as an X-axis, an axis perpendicular to the X-axis within the plane 142 is defined as a Y-axis, and a direction apart from the support substrate 103 is defined as a positive Y-direction. Further, an axis perpendicular to the plane 142 is defined as a Z-axis, and a direction toward the light receiving element array 150 is defined as a positive Z-direction. Although the lens array 140 is integrally formed in this embodiment, the lens array 140 may be a so-called hybrid lens array obtained by integrating the condenser lenses 40 that are separately formed, and may be a set of a plurality of condenser lenses arranged in one direction with their optical axes in parallel to each other.

Figure 3:
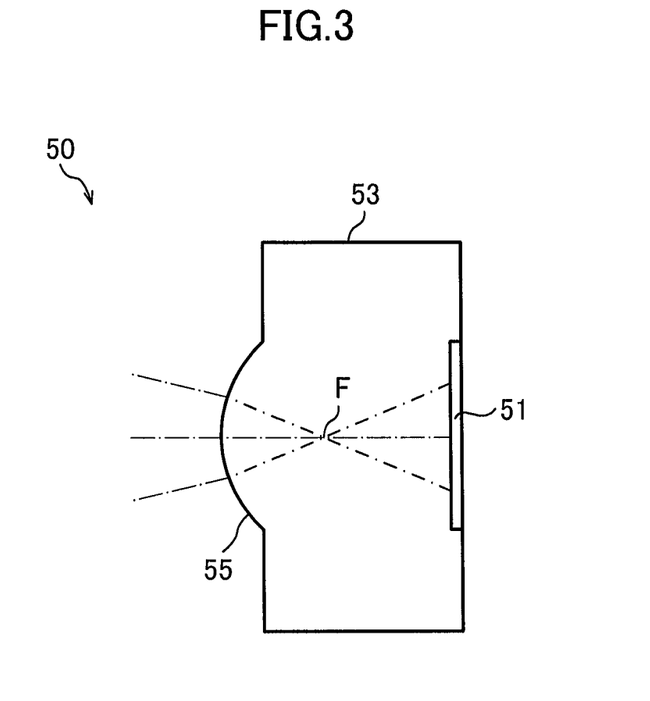
FIG. 3 is a diagram illustrating a light receiving element of the light receiving element array.

FIG. 3 is a diagram illustrating the light receiving element 50 of the light receiving element array 150. The light receiving element 50 is aback-illuminated photodiode in which a light receiving portion 51 is arranged on a surface of one side of a semiconductor substrate 53, and the input light is converted into the electrical signal by the light receiving portion 51. In this embodiment, the wavelength of the input light is in 1.3-μm band or 1.55-μm band, and the semiconductor substrate 53 is an InP substrate having sufficient transparency for these wavelength bands. However, any wavelength band and substrate material other than the above-mentioned ones can be used. A light receiving element lens 55, which is spherically shaped and protrudes toward the lens array 140, is formed on a surface of the other side of the semiconductor substrate 53. For example, the light receiving element lens 55 is formed by selectively etching the semiconductor substrate 53. However, the present invention is not limited to this. For example, a lens can be separately formed on the semiconductor substrate 53. The light from the lens array 140 is input into the semiconductor substrate 53 from the light receiving element lens 55 and further focused toward the light receiving portion 51 by the light receiving element lens 55. The light receiving element 50 may not include the light receiving element lens 55, and the light receiving element lens 55 may be a lens separately provided on the rear surface of the semiconductor substrate 53.

In this specification, it suffices that a direction of the light between the light receiving element lens 55 and the light receiving portion 51 be closer to a center axis of the condenser lens 40 than a direction of the light between the lens array 140 and the light receiving element lens 55, in order to support the description that "the light receiving element lens 55 focuses the light from the lens array 140 toward the light receiving portion 51" (except for the light on the center axis), which is not limited to a case where a focal point F is located on the light receiving portion 51.

Further, although the focusing status of the light is described as an expression of the "focal point", a "beam waist" that is a point where a light beam is most focused has virtually the same meaning, and hence the inventive concept of the present invention is not changed even when a "position of the beam waist" is considered in lieu of a "position of the focal point". Referring back to FIG. 1, although the lens array 140 is fixed on the support substrate 103 by a fixing agent 106 such as an adhesive via a base 105, in order to suppress a light reflection attenuation amount at the light receiving portion 51, the lens array 140 is arranged by shifting the center of the condenser lens 40 toward an upper side of the center of the light receiving portion 51, i.e., toward the positive Y-direction. With this arrangement, the output light beam from the condenser lens is input obliquely to the light receiving portion, and a reflection at a surface of the light receiving portion faces a direction that is different from that of the light beam input to the light receiving portion. With this configuration, the light output from the optical demultiplexing circuit 170 is input to each of the light receiving elements 50 of the light receiving element array 150. However, because the center of the condenser lens 40 is shifted from the center axis of the light receiving portion 51, the light reflection attenuation amount at the surface of the light receiving portion 51 can be suppressed. The light reflection attenuation amount can also be suppressed by shifting each of the centers of the condenser lenses 40 by moving the lens array 140 in the X-direction in FIG. 2. However, when the center of the condenser lens 40 is shifted in the X-direction, a reflection is generated at a surface or the like of a mirror or optical filter 70 so that an optical crosstalk is liable to be caused in which reflected light is received by the light receiving portion 51 of another channel. Therefore, in this embodiment, the condenser lens 40 is arranged in a manner that a shift of the center of the condenser lens 40 in the Y-direction from the center axis of the light receiving portion 51 is larger than a shift of the center of the condenser lens 40 in the X-direction, thus suppressing the light reflection attenuation amount. With this configuration, degradation of a signal due to the generation of the optical crosstalk can be suppressed, and at the same time, the attenuation amount due to the light reflection can be suppressed.

A case where the focal point F is located on the light receiving portion 51 indicates a state in which a light receiving tolerance is largest. However, because the light with which the light receiving surface is irradiated is in a state of being close to a point, the high frequency characteristic is liable to be degraded due to the space charge effect. The space charge effect is a phenomenon where, due to a local generation of high-density charges (electron-hole pairs) in a depletion layer of the light receiving portion 51, an internal electric field having a direction opposite to that of the original electric field applied in the depletion layer by an external bias voltage is generated, which cancels out the original electric field intensity, resulting in the degradation of the high frequency characteristic.

Figure 4:
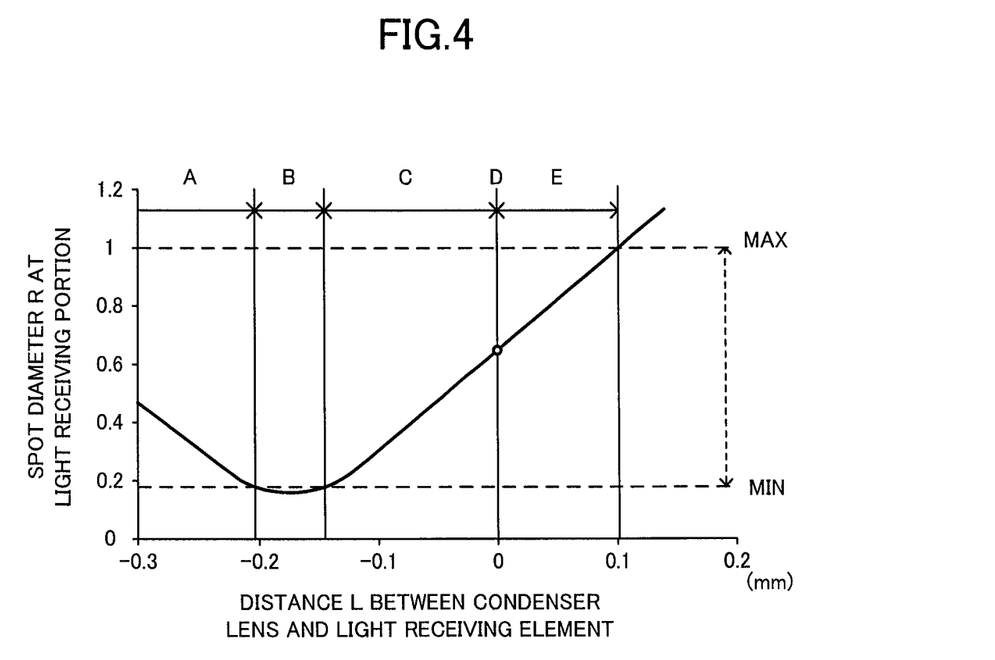
FIG. 4 is a graph showing a relationship between a distance L between a condenser lens and a light receiving element illustrated in FIG. 1 and a spot diameter R of light received by a light receiving portion.

FIG. 4 is a graph showing a relationship between a distance L between the condenser lens 40 and the light receiving element 50 illustrated in FIG. 1 and a spot diameter R of the light received by the light receiving portion 51. FIGS. 5A to 5E are diagrams schematically illustrating positions of the focal point F corresponding to ranges A to E of the distance L shown in FIG. 4, respectively. FIGS. 6A to 6E are graphs showing light receiving efficiency and back reflection light loss with respect to an offset between the center axis of the condenser lens 40 and the center axis of the light receiving portion 51, corresponding to the ranges A to E of the distance L shown in FIG. 4, respectively. The "back reflection light loss" as used herein is a value representing a ratio of back reflection light to input light in a logarithmic manner, and as this value increases, the light reflection attenuation amount decreases. The distance L in FIG. 4 takes a reference (0) when the focal point F is located on the surface of the light receiving element lens 55, and the light-receivable spot diameter R is in a range, for example, from about 0.18 to about 1.00 of a spot diameter of a beam waist when a radius of the light receiving portion 51 is 1, which is represented by a minimum value MIN to a maximum value MAX in the graph. The minimum value MIN is not limited to this value, but is determined to avoid the space charge effect.

As a specific example, the spot diameter R of the maximum value MAX in a desired range is, for example, when an effective light-receiving radius of a general 25 Gb/s photodiode is 8.0 μm, as large as this effective light-receiving radius. Further, the spot diameter R of the minimum value MIN in a desired range is, for example, determined not to cause a problem of the space charge effect, and although depending on the performance of the photodiode, is about 2 μm to 3 μm.

The range B of the distance L in FIG. 4 indicates a case where the spot diameter R at the light receiving portion 51 is below the minimum value MIN of the desired range. In this case, as shown in FIG. 5B, the focal point F is located on or near the surface of the light receiving portion 51. When the spot diameter R at the surface of the light receiving portion 51 is below the minimum value MIN of the desired range, the high frequency characteristic is liable to be degraded due to the space charge effect as described above.

Figure 5A:
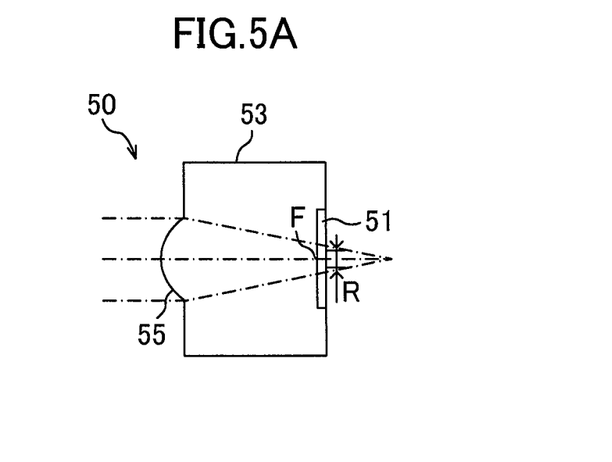
FIG. 5A is a diagram schematically illustrating a position of a focal point F corresponding to a range A of the distance L shown in FIG. 4.
Figure 5B:
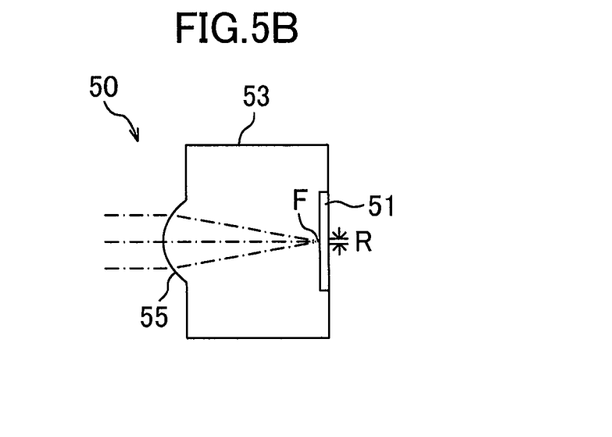
FIG. 5B is a diagram schematically illustrating a position of a focal point F corresponding to a range B of the distance L shown in FIG. 4.

The range A of the distance L in FIG. 4 indicates, as shown in FIG. 5A, a case where the focal point F is located on a side opposite to the condenser lens 40 side of the light receiving portion 51. In this case, the spot diameter R is equal to or larger than the minimum value MIN. However, because the area of the light receiving element lens 55 needs to be used in an expanded manner, in some cases, the light is liable to be emitted in a range larger than the light receiving element lens 55. Further, even when the light falls within the range of the light receiving element lens 55, because the light receiving element lens 55 particularly formed by etching or the like is liable to be far from the ideal curved surface as the distance increases from the center, and hence using an outside of the light receiving element lens 55 as a consequence is liable to increase light that is not emitted to the light receiving portion 51. For this reason, it is considered that it is better not to use the range A of the distance L that uses a wide range of the light receiving element lens 55.

Figure 5C:
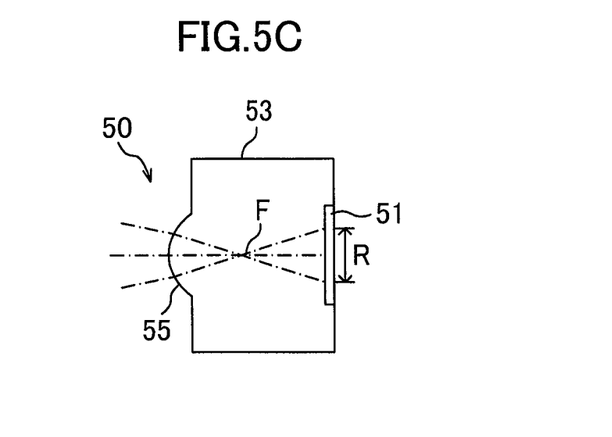
FIG. 5C is a diagram schematically illustrating a position of a focal point F corresponding to a range C of the distance L shown in FIG. 4.
Figure 5D:
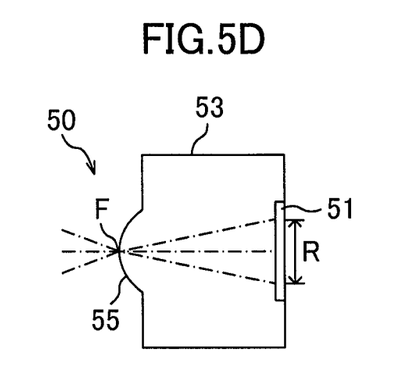
FIG. 5D is a diagram schematically illustrating a position of a focal point F corresponding to a range D of the distance L shown in FIG. 4.
Figure 6A:
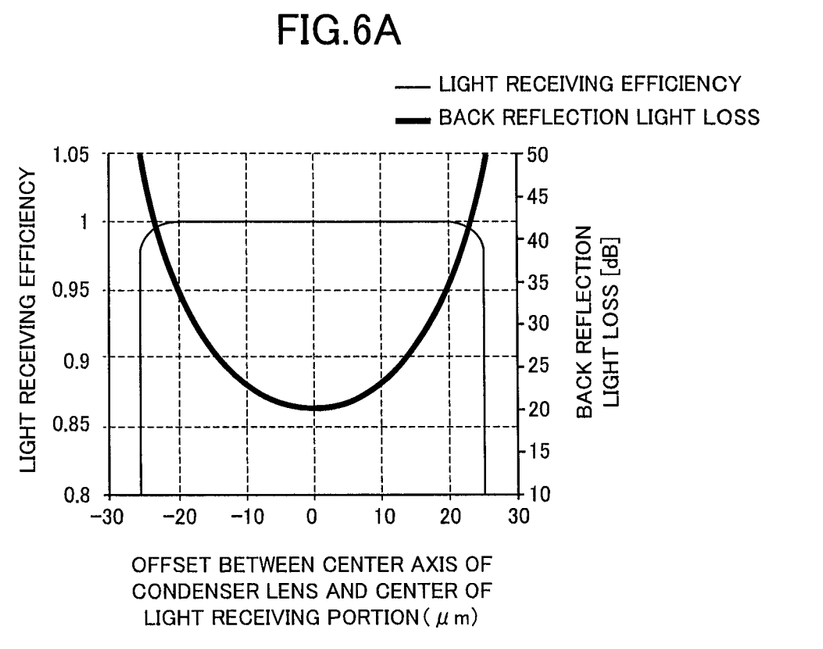
FIG. 6A is a graph showing light receiving efficiency and back reflection light loss with respect to an offset between a center axis of the condenser lens and a center axis of the light receiving portion, corresponding to the range A of the distance L shown in FIG. 4.
Figure 6B:
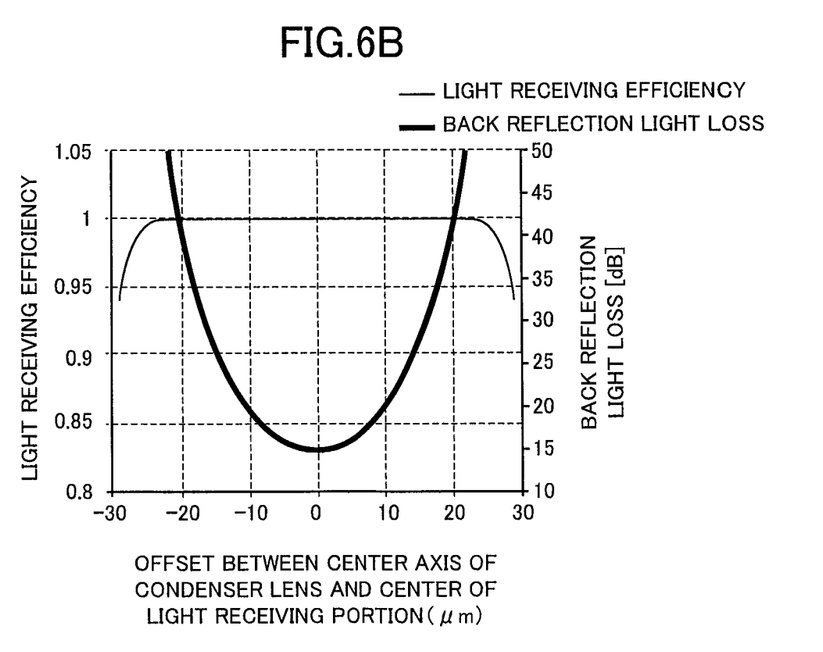
FIG. 6B is a graph showing light receiving efficiency and back reflection light loss with respect to an offset between a center axis of the condenser lens and a center axis of the light receiving portion, corresponding to the range B of the distance L shown in FIG. 4.
Figure 6C:
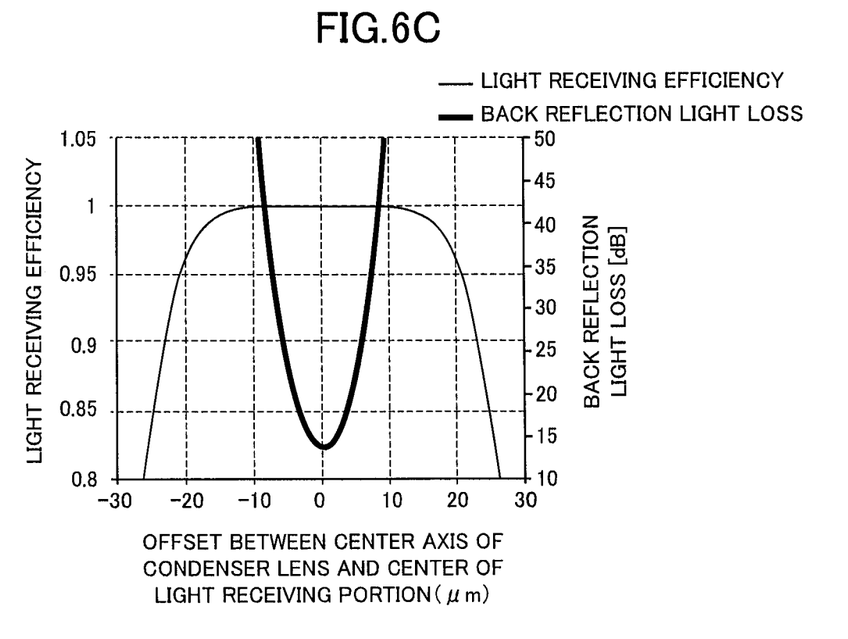
FIG. 6C is a graph showing light receiving efficiency and back reflection light loss with respect to an offset between a center axis of the condenser lens and a center axis of the light receiving portion, corresponding to the range C of the distance L shown in FIG. 4.
Figure 6D:
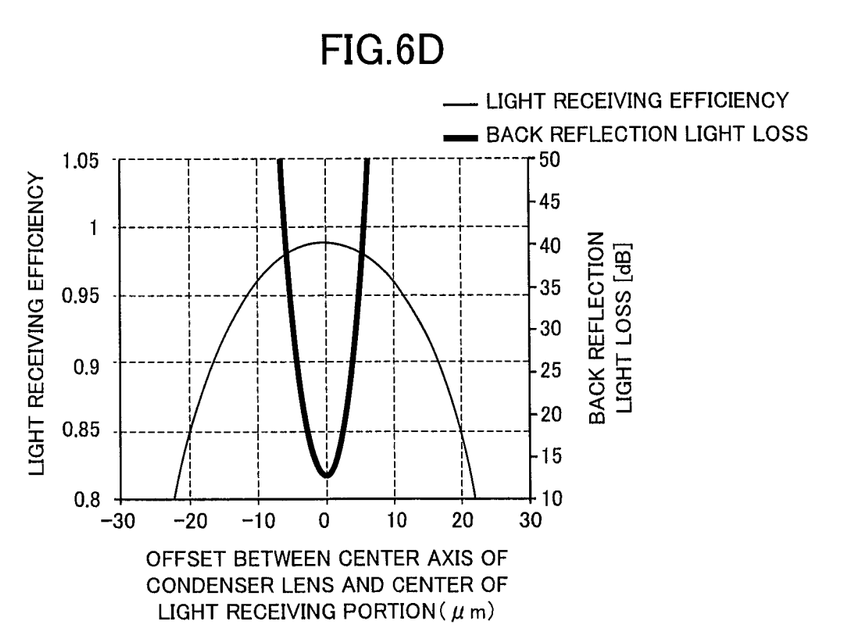
FIG. 6D is a graph showing light receiving efficiency and back reflection light loss with respect to an offset between a center axis of the condenser lens and a center axis of the light receiving portion, corresponding to the range D of the distance L shown in FIG. 4.

The position D of the distance L in FIG. 4 is, as shown in FIG. 5D, a position on the surface of the light receiving element lens 55 where the focal point F is located. However, in this case, the light receiving efficiency is liable to be degraded due to a reflection of the light at the surface of the light receiving element lens 55, and hence it is better not to use the position D. Further, as shown in FIG. 6D, a range where the light receiving efficiency is acceptable is narrow as compared with the graphs shown in FIGS. 6A to 6C, and even when the center axis of the condenser lens 40 is offset from the center of the light receiving portion in order to reduce the influence of the back reflection light, this offset leads to the degradation of the light receiving efficiency.

Figure 5E:
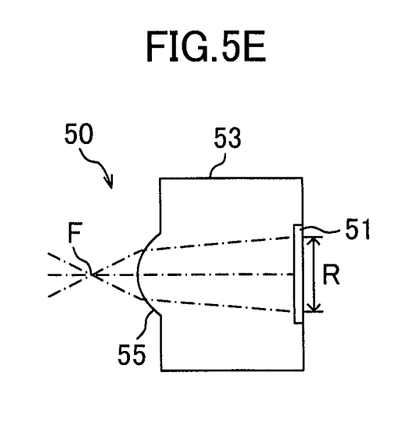
FIG. 5E is a diagram schematically illustrating a position of a focal point F corresponding to a range E of the distance L shown in FIG. 4.
Figure 6E:
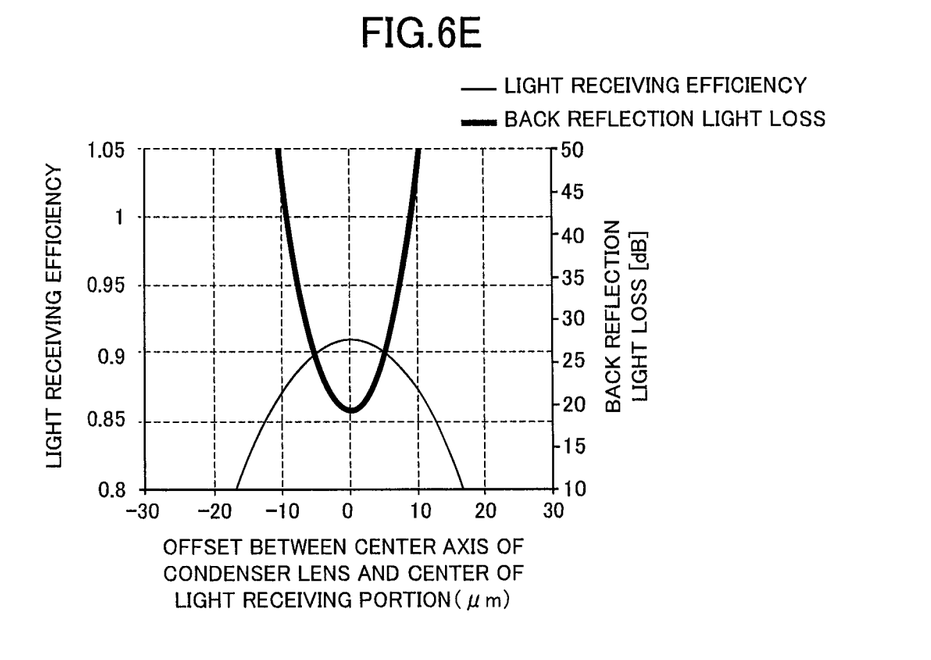
FIG. 6E is a graph showing light receiving efficiency and back reflection light loss with respect to an offset between a center axis of the condenser lens and a center axis of the light receiving portion, corresponding to the range E of the distance L shown in FIG. 4.

In the range E of the distance L in FIG. 4 is, as shown in FIG. 5E, the focal point F is located between the condenser lens 40 and the light receiving element 50. In this case, the light from the condenser lens 40 is focused at the focal point F between the condenser lens 40 and the light receiving element lens 55, and then input to the light receiving element lens 55 in a state of being gradually broadened. The light input inside the semiconductor substrate 53 from the light receiving element lens 55 reaches the light receiving portion 51 with less broadening than before being input. Therefore, the light input to the light receiving element 50 is not fully focused by the light receiving element lens 55, and hence the probability that the light is out of the light receiving portion 51 is increased. Further, as shown in FIG. 6E, the light receiving efficiency is low even when there is no offset between the center of the light receiving portion and the center axis of the condenser lens 40, and hence it is considered that the range E of the distance L is also unsuitable to use.

In the range C of the distance L in FIG. 4, as shown in FIG. 5C, the focal point F is located inside the semiconductor substrate 53. In this case, the light from the condenser lens 40 is input to the light receiving element lens 55 in a state of being gradually narrowed. The light input to the light receiving element lens 55 is focused at the focal point F in the semiconductor substrate 53, and then reaches the light receiving portion 51 in a state of being gradually broadened. The spot diameter R is in a range of the minimum value MIN to the maximum value MAX, and referring to FIG. 6C, high light receiving efficiency is maintained even with respect to a relatively large offset, and the influence of the back reflection light is limited to a small offset range. An offset tolerance range is therefore broad, and hence the high light receiving efficiency can be obtained while avoiding the influence of the back reflection light.

As described above, by setting the distance L to the range C shown in FIG. 4, where the focal point F is located in the semiconductor substrate 53, the range of the high light receiving efficiency is broad, and the offset of the optical axis can be determined in a range where there is no influence of the back reflection light. Further, the light reflection attenuation amount can be suppressed while maintaining the high light receiving efficiency even when the center axis of the condenser lens 40 is shifted larger in the Y-direction than in the X-direction as shown in FIG. 1. In addition, the tolerance range of the offset amount is broad, and hence even when there is a fluctuation in the mounting position, the offset amount can be kept within a range where the light receiving efficiency is high. Hence, the optical receiver module having higher transmission efficiency can be obtained.

The range C of the distance L where the focal point F is located in the semiconductor substrate 53 is determined based on the distance L between the lens array 140 and the light receiving element array 150, the thickness of the semiconductor substrate 53 (distance between the light receiving element lens 55 and the light receiving portion 51), and optical parameters of the condenser lens 40 and the light receiving element lens 55.

As described above with reference to FIG. 1, to fix the lens array 140 to the support substrate 103, the fixing agent 106 is used via the base 105. However, the thickness of the fixing agent 106 needs to be determined based on the tolerance range at the light receiving portion 51, the manufacturing tolerance of the condenser lens 40, and the manufacturing tolerance of the fixing agent 106. As shown in FIG. 5C, by determining the distance L to be the range C shown in FIG. 4 such that the focal point F is located at a position in the semiconductor substrate 53, the tolerance range can be increased, and hence the tolerance range of the offset amount is also increased. When an adhesive is used as the fixing agent 106, performing a positioning while moving the lens array 140 in a direction of the Y-direction that is apart from the support substrate 103 can save the amount of the adhesive, and hence the thickness of the fixing agent 106 can be reduced. Therefore, it is preferred that the shift of the center axis of the condenser lens 40 from the center axis of the light receiving portion 51 on the Y-axis be in the positive Y-direction. Further, according to the result of a study of the inventors of the present invention, about 8 μm to 25 μm of the shift in the Y-direction can secure 35 dB or more of the light reflection attenuation amount and 0.85 or more of the light receiving efficiency with a thinner thickness of the adhesive, and hence the condenser lens can be fixed with an ignorable level of expansion and contraction amount of the adhesive due to the temperature and variation of the adhesive due to the long term reliability, which is about 1 μm. In this case, when the shift in the X-direction is in a range of from 0 μm to 10 μm, the condenser lens can be mounted with virtually no degradation of the coupling efficiency. Although this example defines the securable range to the coupling efficiency of 0.85 or more and the light reflection attenuation amount of 35 dB or more, because the standard of the required coupling efficiency and light reflection attenuation amount differs depending on an optical communication system to which this optical receiver module is applied, the tolerance range for the shifts in the X-direction and the Y-direction can be changed accordingly. Further, although the fixing agent 106 between the base 105 and the lens array 140 can be a spacer or the like, it is preferred to use, for example, a UV-curable adhesive or the like that can be fixed while performing a fine adjustment at the time of manufacturing. Moreover, the base 105 is used to adjust the height, and hence the base 105 may be omitted when the height adjustment is not necessary. For example, it suffices to make the support substrate 103 with a form in which the height is adjusted in advance.

Further, as illustrated in FIG. 2, the lens array 140 and the light receiving element array 150 are provided, and hence when the lens array 140 and the light receiving element array 150 cannot be arranged in parallel to each other due to, for example, a difference between a distance Z1 and a distance Z2, it is liable that the light receiving efficiency is high at the light receiving element 50 on one side but the light receiving efficiency is low at the light receiving element 50 on the other side. However, the distance L is set to the range C shown in FIG. 4 as described above, and hence the tolerance range of the offset amount is broad and signals can be received with high light receiving efficiency even when there is an error in the arrangement.

Figure 7:
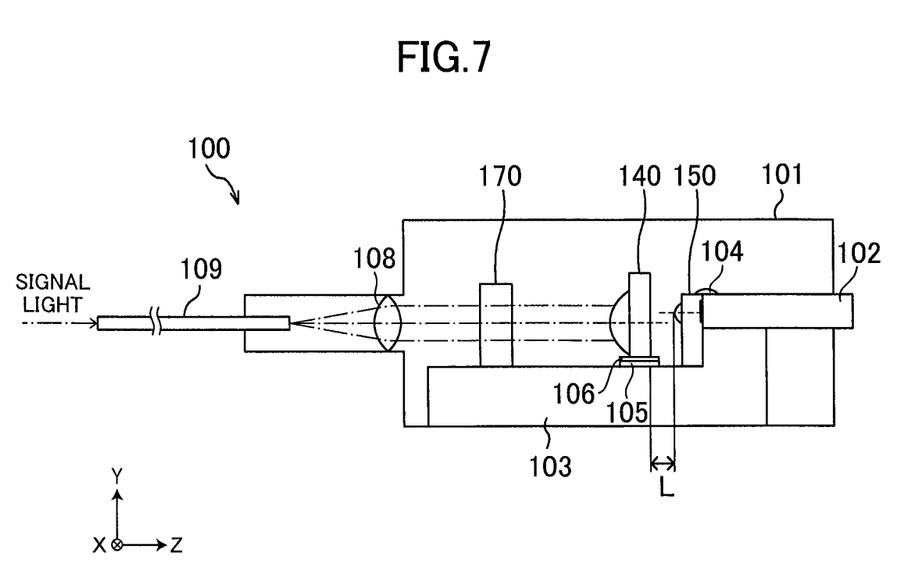
FIG. 7 is a diagram illustrating a first modification example of the above-mentioned embodiment.

FIG. 7 is a diagram illustrating a first modification example of the above-mentioned embodiment. The first modification example is similar to the above-mentioned embodiment except that the offset is defined such that the center axis of the condenser lenses 40 is shifted from the center axis of the light receiving portion 51 to the negative Y-direction, i.e., toward the support substrate 103 side. With such a configuration as well, an effect similar to that of the above-mentioned embodiment can be obtained.

Figure 8:
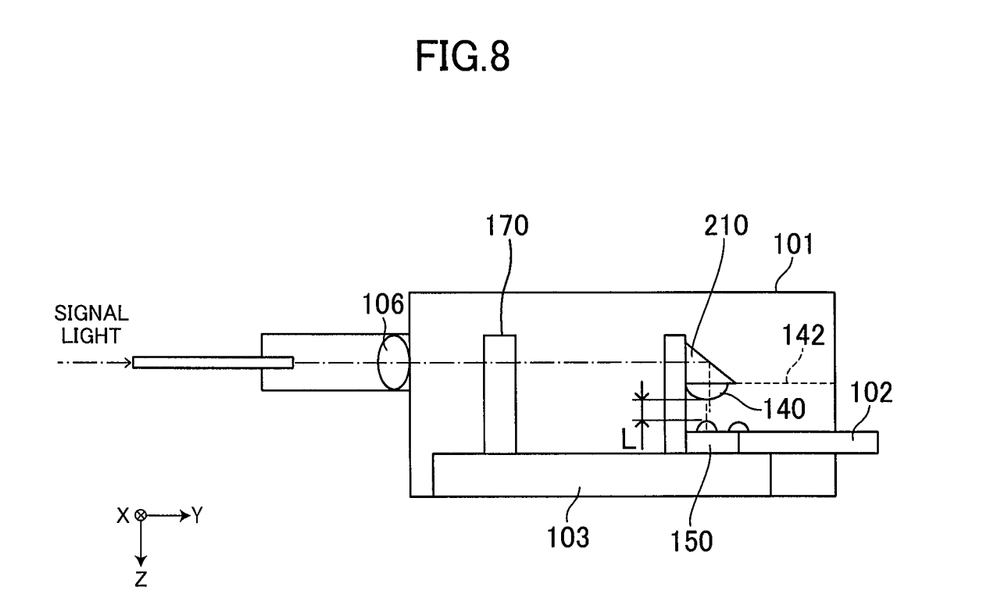
FIG. 8 is a diagram illustrating a second modification example of the above-mentioned embodiment.

FIG. 8 is a diagram illustrating a second modification example of the above-mentioned embodiment. In this example, the signal light output from the optical demultiplexing circuit 170 is reflected at a mirror 210 to a direction of the support substrate 103, and then input to the lens array 140 and received by the light receiving element array 150. In this case as well, the lens array 140 is formed by arranging the condenser lenses 40 in one direction to define the single plane 142 with the optical axes in parallel to each other, and the X-axis that is the direction in which the condenser lenses 40 are arranged, the Y-axis that is the direction perpendicular to the X-axis within the plane 142, and the Z-axis perpendicular to the plane 142 are determined as illustrated in FIG. 8. Therefore, similar to the above-mentioned embodiment, the shift of the center axis of the condenser lens 40 from the center of the light receiving element 50 is determined to be larger in the direction of the Y-axis than in the direction of the X-axis, by which the degradation of the signal due to the generation of the optical crosstalk can be suppressed, and at the same time, the attenuation amount due to the light reflection can be suppressed. Further, by determining the distance L between the condenser lenses 40 and the light receiving element 50 such that the focal point F is located in the semiconductor substrate of the light receiving element 50, even when the center axis of the condenser lenses 40 is shifted more toward the direction of the Y-axis than toward the direction of the X-axis, the light reflection attenuation amount can be suppressed while maintaining high light receiving efficiency. Moreover, because the tolerance range of the offset amount is broad, even when a fluctuation is generated in the mounting position, the offset amount can be kept within a range where the light receiving efficiency is high. Hence, an optical receiver module having higher transmission efficiency can be obtained.

Figure 9:
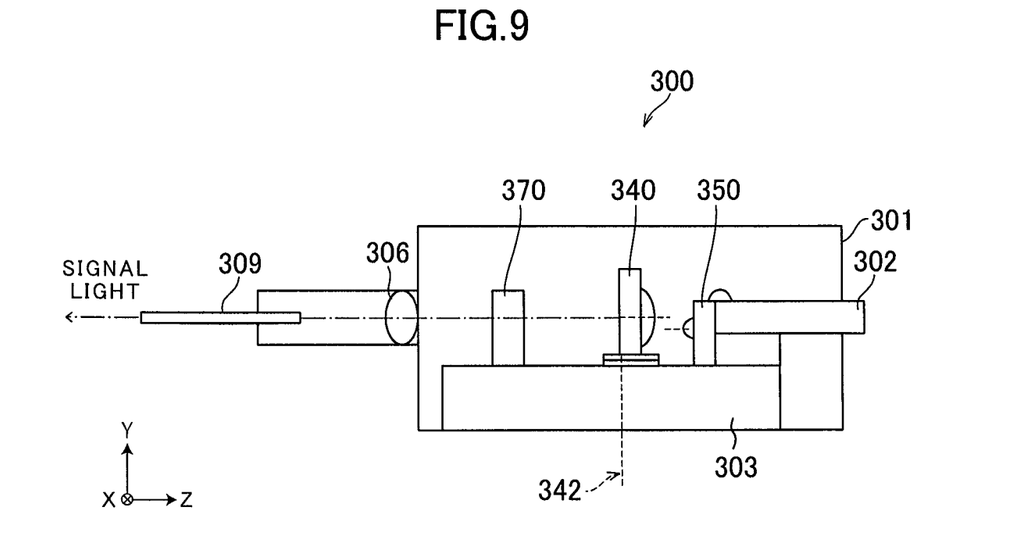
FIG. 9 is a diagram illustrating a third modification example of the above-mentioned embodiment.

FIG. 9 is a diagram illustrating a third modification example of the above-mentioned embodiment. The above-mentioned embodiments have described examples in which the present invention are applied to the optical receiver module. However, the third modification example describes an example in which the present invention is applied to an optical transmitter module. An optical transmitter module 300 illustrated in FIG. 9 includes a box-shaped casing 301, and a support substrate 303 is arranged in the casing 301. On the support substrate 303, a circuit board 302 configured to process an electrical signal, a light emitting element array 350 including four-channel light emitting elements each configured to convert the electrical signal into light and to emit the light, an optical multiplexing circuit 370 configured to multiplex the light of four channels are mounted. A collimator lens 306 is further arranged in the casing 301. Light emitted from the light emitting element array 350 is collimated by the collimator lens 306 via a lens array 340 and the optical multiplexing circuit 370, and output to outside of the casing 301 via an optical fiber 309.

In this case as well, the lens array 340 is formed by arranging the condenser lenses in one direction to define a single plane 342 with the optical axes in parallel to each other, and the X-axis that is the direction in which the condenser lenses are arranged, the Y-axis that is the direction perpendicular to the X-axis within the plane 342, and the Z-axis perpendicular to the plane 342 are determined as illustrated in FIG. 9. Therefore, the shift of the center axis of the condenser lens of the lens array 340 from the center of the light emitting element of the light emitting element array 350 is determined to be larger in the direction of the Y-axis than in the direction of the X-axis, by which the degradation of the signal due to the generation of the optical crosstalk can be suppressed, and at the same time, the attenuation amount due to the light reflection can be suppressed. As a result, an optical transmitter module having higher transmission efficiency can be obtained.

Although the embodiments of the present invention have been described above, the present invention is not limited to the above-mentioned embodiments, it goes without saying that various modifications may be made by a person having ordinary skill in the art. For example, the light receiving element array 150 can be obtained by integrating a plurality of light receiving portions 51 on the same semiconductor substrate or by mounting a plurality of light receiving elements 50 on the same sub-mount.

In addition, it suffices that the light receiving element 50 be obtained by mounting a photodiode on a semiconductor substrate through which the input light is sufficiently transmittable and arranging a lens surface on a side of a surface on which the photodiode is not mounted, rather than the back-illuminated photodiode in which the light receiving portion 51 is formed on the semiconductor substrate.

While there have been described what are at present considered to be certain embodiments of the invention, it will be understood that various modifications may be made thereto, and it is intended that the appended claim cover all such modifications as fall within the true spirit and scope of the invention.

What is claimed is:
1. An optical receiver module, comprising:
a lens array including a plurality of condenser lenses; and
a light receiving element array including a plurality of light receiving elements having a plurality of light receiving portions, respectively, each of the plurality of light receiving portions configured to receive light which is emitted from a corresponding condenser lens and to convert the light into an electrical signal, wherein the light is emitted from the corresponding condenser lens directly to the light receiving element array and in a direction that intersects the light receiving element array, wherein the plurality of light receiving portions are arranged in a first direction to define a single plane with optical axes in parallel to each other, wherein a center axis of each of the plurality of light receiving portions is shifted from optical axis of the light emitted from the corresponding condenser lens, and wherein a shift of the center axis of the each of the plurality of light receiving portions from the optical axis of the light emitted from the corresponding condenser lens is larger in a second direction, perpendicular to the first direction within the single plane, than in the first direction.

2. The optical receiver module according to claim 1, further comprising a support substrate on which the lens array and the light receiving element array are arranged, wherein the shift of the center axis of the each of the plurality of light receiving portions in the second direction is a shift in a direction apart from the support substrate.

3. The optical receiver module according to claim 1, wherein:

the shift of the center axis of the each of the plurality of light receiving portions in the first direction is in a range of from 0 µm to 10 µm; and the shift of the center axis of the each of the plurality of light receiving portions in the second direction is in a range of from 8 µm to 25 µm.

4. An optical receiver module comprising:

a lens array including a plurality of condenser lenses; and a light receiving element array including a plurality of light receiving elements, each configured to receive light emitted from a corresponding condenser lens, each of the plurality of light receiving elements comprising:

a semiconductor substrate to which the light emitted from the corresponding condenser lens is input and through which the light is transmitted;

a light receiving portion configured to receive the light transmitted through the semiconductor substrate and to convert the received light into an electrical signal; and a light receiving element lens arranged on incident side of the semiconductor substrate and configured to condense the light from the corresponding condenser lens further toward the light receiving portion, wherein the light is emitted from the corresponding condenser lens in a direction that intersects the light receiving element array, wherein a plurality of the light receiving element lenses are arranged in a first direction to define a single plane with optical axes in parallel to each other, wherein a center axis of each of the plurality of the light receiving element lenses is shifted from optical axis of the light emitted from the corresponding condenser lens, and wherein a shift of the center axis of the each of the plurality of the light receiving element lenses from the optical axis of the light emitted from the corresponding condenser lens is larger in a second direction, perpendicular to the first direction within the single plane, than in the first direction.

5. The optical receiver module according to claim 4, further comprising a support substrate on which the lens array and the light receiving element array are arranged, wherein the shift of the center axis of the each of the plurality of the light receiving element lenses in the second direction is a shift in a direction apart from the support substrate.

6. The optical receiver module according to claim 4, wherein:

the shift of the center axis of the each of the plurality of the light receiving element lenses in the first direction is in a range of from 0 µm to 10 µm; and the shift of the center axis of the each of the plurality of the light receiving element lenses in the second direction is in a range of from 8 µm to 25 µm.

* * * * *